United States Patent
Takeda

(10) Patent No.: US 9,047,110 B2
(45) Date of Patent: Jun. 2, 2015

(54) VIRTUAL MACHINE HANDLING SYSTEM, VIRTUAL MACHINE HANDLING METHOD, COMPUTER, AND STORAGE MEDIUM

(75) Inventor: Shingo Takeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 293 days.

(21) Appl. No.: 13/575,889

(22) PCT Filed: Jan. 24, 2011

(86) PCT No.: PCT/JP2011/000363
§ 371 (c)(1),
(2), (4) Date: Jul. 27, 2012

(87) PCT Pub. No.: WO2011/093051
PCT Pub. Date: Aug. 4, 2011

(65) Prior Publication Data
US 2012/0304176 A1    Nov. 29, 2012

(30) Foreign Application Priority Data
Jan. 29, 2010   (JP) ................................ 2010-019558

(51) Int. Cl.
G06F 9/455    (2006.01)
G06F 9/48    (2006.01)

(52) U.S. Cl.
CPC .......... *G06F 9/45533* (2013.01); *G06F 9/4856* (2013.01)

(58) Field of Classification Search
None
See application file for complete search history.

(56) References Cited

U.S. PATENT DOCUMENTS 8,156,301 B1 *   4/2012   Khandelwal et al. ......... 711/170
2009/0106409 A1   4/2009   Murata
2009/0144389 A1   6/2009   Sakuta

FOREIGN PATENT DOCUMENTS

| JP | 2007-536657 A | 12/2007 |
| JP | 2008-217302 A | 9/2008 |
| JP | 2009-116852 A | 5/2009 |
| JP | 2009-140053 A | 6/2009 |

OTHER PUBLICATIONS

Kuniyasu Suzaki, "Current Implementation of Network Transferable Computer", Technical Report of IEICE, 2000, pp. 149-156, vol. 100, No. 86.

Christopher Clark et al., "Live Migration of Virtual Machines", Proceedings of the 2nd conference on Symposium on Networked Systems Design & Implementation, 2005, pp. 273-286.

International Search Report for PCT/JP2011/000363 dated Mar. 29, 2011.

* cited by examiner

Primary Examiner — Mengyao Zhe
(74) Attorney, Agent, or Firm — Sughrue Mion, PLLC

(57) ABSTRACT

A memory retaining unit (106) of a virtual machine handling system (10) retains a memory image (IMG) of a first computer (100). An update recording unit (203) records update information (UD) indicating a partial region of a memory image (IMG1) which is updated by the execution of a transferred virtual machine (VM) by a virtual machine execution unit (202) of a second computer (200). When receiving an undo request, a return unit (160) transmits partial data (PD) indicated by the update information (UD) from the second computer (200) to the first computer (100). A virtual machine execution unit (102) of the first computer (100) executes a continuing process of the virtual machine (VM) using the memory image (IMG) retained in the memory retaining unit (106) and the partial data (PD) received from the second computer (200).

17 Claims, 9 Drawing Sheets

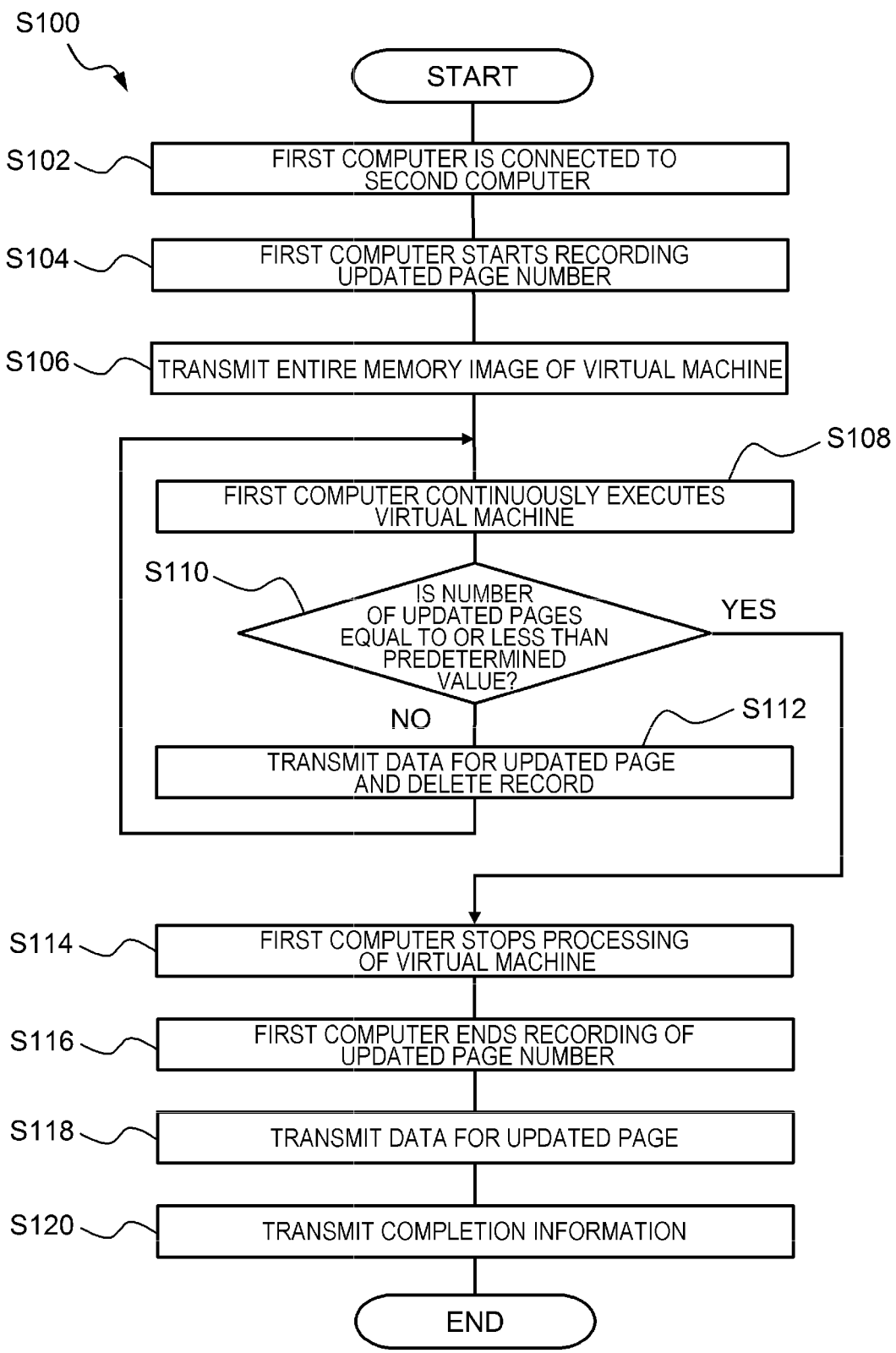

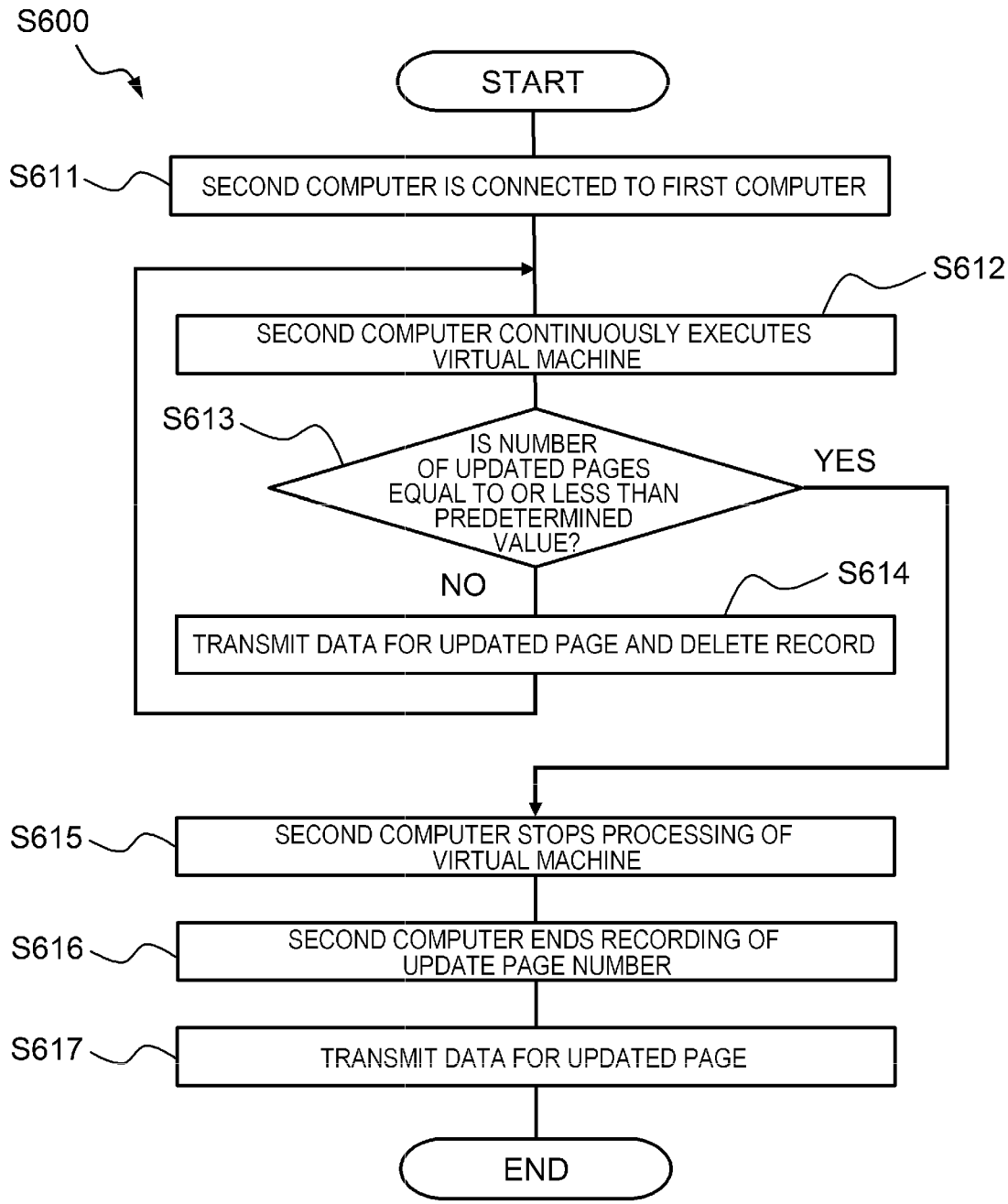

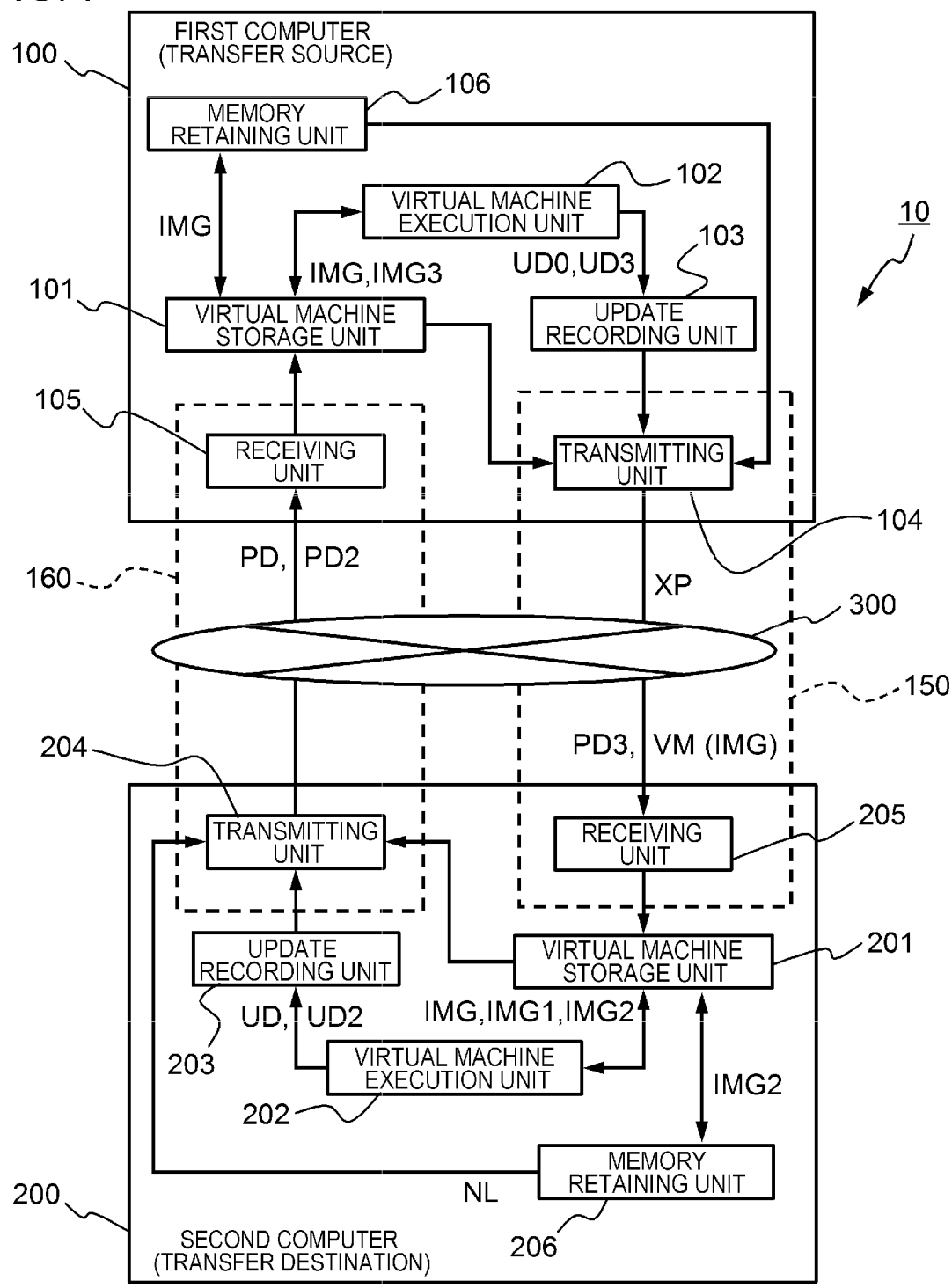

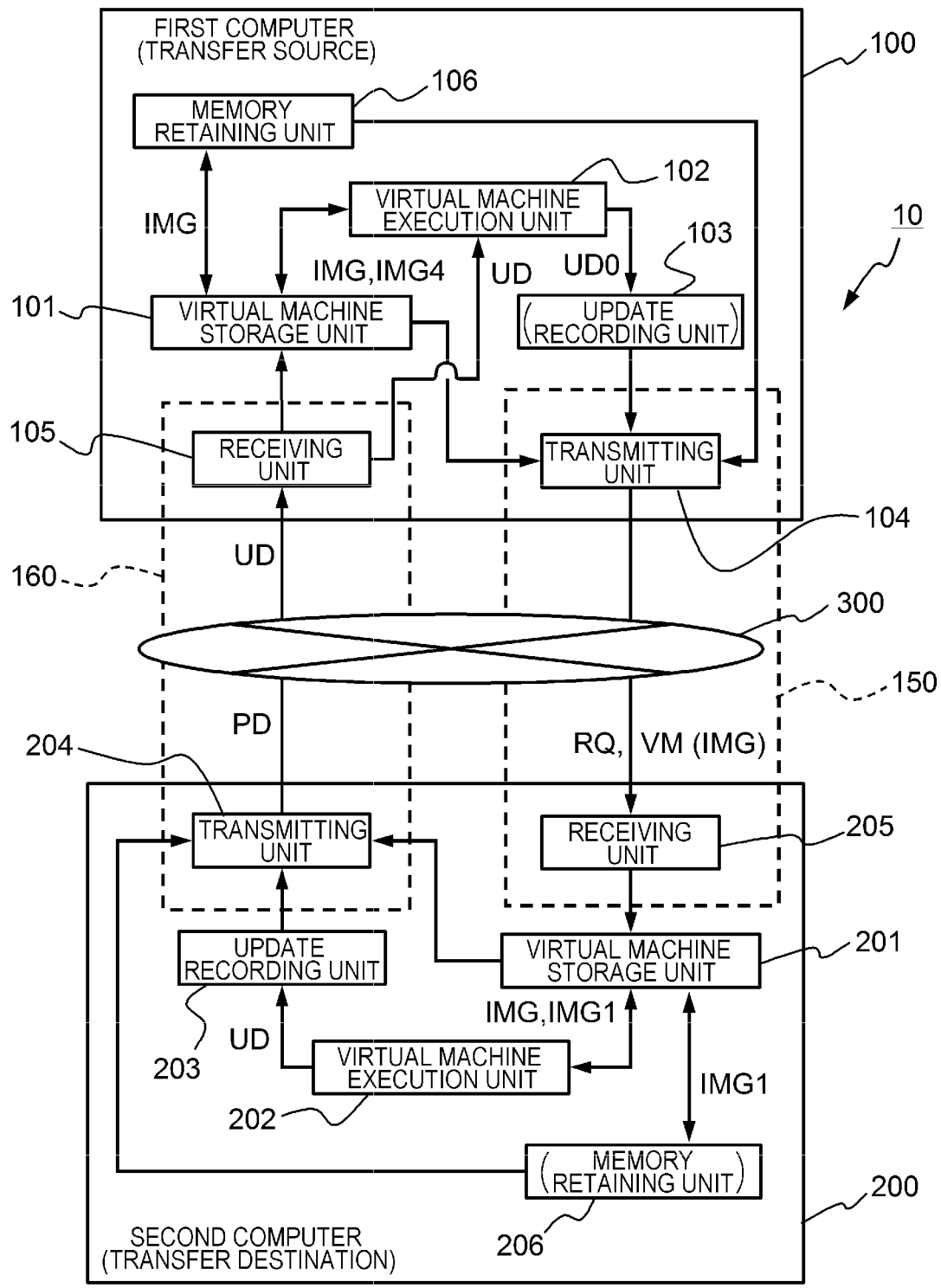

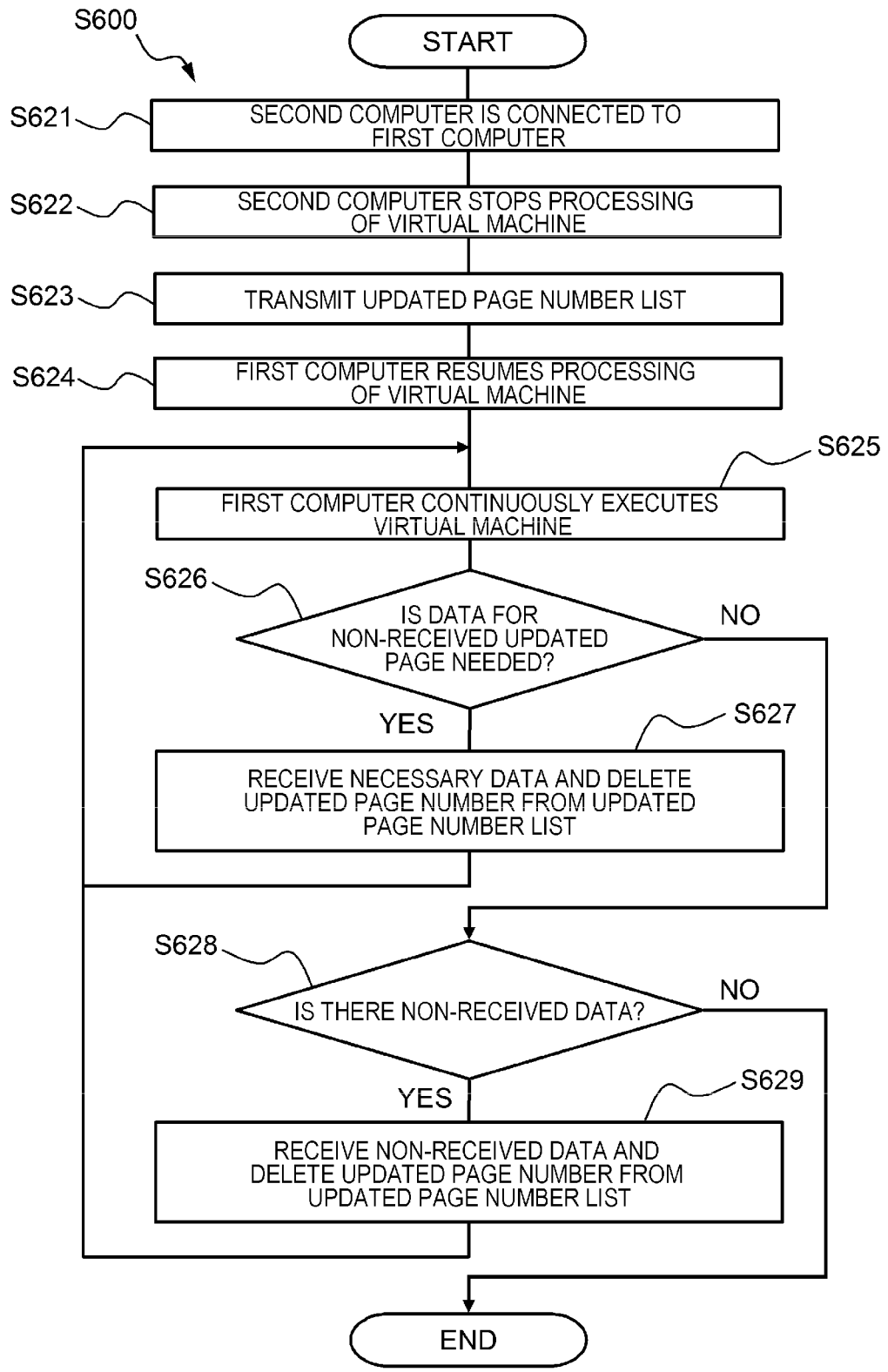

VIRTUAL MACHINE HANDLING SYSTEM, VIRTUAL MACHINE HANDLING METHOD, COMPUTER, AND STORAGE MEDIUM

CROSS REFERENCE TO RELATED APPLICATIONS

This application is a National Stage of International Application No. PCT/JP2011/000363 filed Jan. 24, 2010, claiming priority based on Japanese Patent Application No. 2010-019558 filed Jan. 29, 2010, the contents of all of which are incorporated herein by reference in their entirety.

TECHNICAL FIELD

The present invention relates to a virtual machine handling system, a virtual machine handling method, a computer that executes a virtual machine, and a storage medium that stores a computer program for the computer. More particularly, the invention relates to a virtual machine handling system that transfers a virtual machine through a network, a virtual machine handling method, a computer, and a storage medium that stores a program.

BACKGROUND ART

A virtualization technique is used to operate one or more virtual computers on one physical computer. The virtual computer is referred to as a virtual machine.

An expression of "a computer hosts a virtual machine" means that the computer operates a virtual machine. Similarly to the physical computer, an operating system (OS) and applications are operated on the virtual machine.

The virtualization technique has various advantages. For example, the virtualization technique can improve the operation efficiency of the data center. For example, when each of a plurality of physical servers with a low load is replaced with the virtual machine, it is possible to host a plurality of target functions using one physical server. As a result, the use efficiency of the server is improved.

In recent years, a technique which transfers the virtual machine hosted by a computer to another computer through a network, without stopping the services provided by the virtual machine, has been put to practical use. This technique is referred to as live (dynamic) migration.

The use of the live migration makes it possible to change the arrangement of the virtual machines depending on the situation. For example, when some virtual machines are transferred from a high-load server to a low-load server, the speed and reliability of the service are improved and it is possible to raise service quality. In addition, for example, when all of the virtual machines are transferred from the low-load server and the server is turned off, it is possible to reduce power consumption. For example, when the virtual machine is evacuated from the server in which a failure is more likely to occur, it is possible to enhance the reliability of a process.

For this type of technique, Patent Document 1 describes a technique which transfers the virtual machine hosted by a low-load server to another server and turns off a server which does not host the virtual machine, thereby reducing power consumption.

Non-patent Document 1 discloses an iterative pre-copy system (IPC system), which is one of the live migration systems. In the IPC system, before a computer, which is a transfer destination, takes over the process of the virtual machine, all data required for the virtual machine is transmitted from a computer, which is a transfer source, to the computer, which is a transfer destination. After the computer, which is a transfer destination, takes over the process, no data is transmitted from the computer, which is a transfer source.

RELATED DOCUMENT

Patent Document

Patent Document 1: Japanese National Publication of International Patent Application No. 2007-536657

Non-Patent Document

Non-patent Document 1: Christopher Clark, et al, "Live Migration of Virtual Machines", Proceedings of the 2nd conference on Symposium on Networked Systems Design & Implementation, pp 273-286, 2005.

SUMMARY OF THE INVENTION

Technical Problem

The memory image of the virtual machine which has been executed by the computer is transferred from the transfer source to the transfer destination and the computer, which is the transfer destination, takes over the execution of the virtual machine. In this way, the live migration is completed.

However, in the live migration described in Patent Document 1 and Non-patent Document 1, when the computer as the transfer destination which has completed a transfer of the virtual machine is overloaded, it takes a long time to alleviate the overload. For example, this problem occurs when it is difficult to expect a rapid increase in the number of accesses to services, or due to a manual operation error or a defect in operation management software.

In order to alleviate the overload of the computer, which is the transfer destination, it is necessary to transfer some virtual machines from the overloaded computer to another computer (for example, a computer, which is a transfer source, or a third computer). However, since a CPU and a network are used to transmit data for transfer, it takes a long time for the CPU or the network to transfer the virtual machine from the overloaded computer, which is the transfer destination. When the computer, which is the transfer destination, is maintained in the overloaded state for a long time, the quality of the services provided by the virtual machine is reduced for a long time.

The invention has been made in view of the above-mentioned problems and provides a technique capable of alleviating overload in a short time even when a destination computer which has transferred a virtual machine using live migration is overloaded.

Solution to Problem

A virtual machine handling system according to the invention includes: a first computer and a second computer which are connected to each other through a network and each of which includes a virtual machine storage unit that stores a memory image of a virtual machine and a virtual machine execution unit that executes the virtual machine and updates the memory image; a transfer unit that transmits the memory image of the virtual machine executed by the virtual machine execution unit of the first computer to the second computer and transfers the virtual machine from the first computer to the second computer; a memory retaining unit that retains the memory image stored in the virtual machine storage unit of the first computer; an update recording unit that records update information indicating a partial region of the memory image which is updated by the execution of the transferred virtual machine by the virtual machine execution unit of the second computer; and a return unit that transmits data for the partial region indicated by the update information from the second computer to the first computer with reference to the update recording unit when an undo request to return the transferred virtual machine from the second computer to the first computer is received. The virtual machine execution unit of the first computer executes a continuing process of the virtual machine using the memory image retained in the memory retaining unit and the data for the partial region received from the second computer.

A virtual machine handling method according to the invention includes: a transfer step of transmitting a memory image of a virtual machine executed by a first computer to a second computer and transferring the virtual machine from the first computer to the second computer; a memory retaining step of retaining the memory image of the first computer; an update recording step of recording update information indicating a partial region of the memory image updated by the execution of the transferred virtual machine by the second computer; and an undo step of returning the transferred virtual machine from the second computer to the first computer. The undo step includes: a return step of transmitting data for the partial region indicated by the recorded update information from the second computer to the first computer; and a continuous execution step of allowing the first computer to execute a continuing process of the virtual machine using the retained memory image of the first computer and the transmitted data for the partial region.

A computer according to the invention includes: a receiving unit that receives a memory image of a virtual machine executed by another computer which is connected through a network from another computer and accepts a transferred virtual machine; a virtual machine storage unit that stores the received memory image; a virtual machine execution unit that executes the transferred virtual machine and updates the stored memory image; an update recording unit that records update information indicating a partial region of the stored memory image which is updated by the virtual machine execution unit; and a transmitting unit that transmits data for the partial region indicated by the update information to another computer with reference to the update recording unit when an undo request to return the transferred virtual machine to another computer is received.

A storage medium according to the invention stores a computer program, which allows a computer including a virtual machine execution unit to execute a virtual machine to perform data processing, so as to be readable by the computer. The data processing includes: a receiving process of receiving a memory image of a virtual machine executed by another computer which is connected through a network from another computer and accepting a transferred virtual machine; a virtual machine storage process of storing the received memory image; a virtual machine execution process of executing the transferred virtual machine and updating the stored memory image; an update recording process of recording update information indicating a partial region of the stored memory image which is updated by the virtual machine execution unit; and a transmitting process of transmitting data for the partial region indicated by the update information to another computer when an undo request to return the transferred virtual machine to another computer is received.

A computer according to the invention includes: a virtual machine storage unit that stores a memory image of a virtual machine; a virtual machine execution unit that executes the virtual machine and updates the memory image; a transmitting unit that transmits the memory image to another computer which is connected through a network and transfers the virtual machine; and a receiving unit that receives data for a partial region of the memory image which is updated by another computer. The virtual machine storage unit stores the memory image of the transferred virtual machine, and the virtual machine execution unit executes a continuing process of the virtual machine using the stored memory image and the received data for the partial region.

A computer program according to the invention is a storage medium that stores a computer program, which allows a computer executing a virtual machine to perform data processing, so as to be readable by the computer. The data processing includes: a virtual machine storage process of storing a memory image of the virtual machine; a virtual machine execution process of executing the virtual machine and updating the memory image; a transmitting process of transmitting the memory image to another computer which is connected through a network and transferring the virtual machine; a retaining process of retaining the memory image of the transferred virtual machine; a receiving process of receiving data for a partial region of the memory image which is updated by another computer; and a virtual machine continuous execution process of executing a continuing process of the virtual machine using the retained memory image and the received data for partial region receive.

Various components of the virtual machine handling system according to the invention do not require to be individually provided. For example, the following structures may be allowed: a structure in which the plurality of components form one hardware component; a structure in which one component is formed by a plurality of hardware components; a structure in which a component is a part of another component; and a structure in which a portion of a component and a portion of another component overlap each other.

In the virtual machine handling method according to the invention, a plurality of processes are sequentially described, but the order in which the plurality of processes are described does not limit the order in which the plurality of processes are performed. Therefore, when the virtual machine handling method according to the invention is performed, the order of the plurality of processes may be changed in the range in which the content of the plurality of processes is not changed.

In the virtual machine handling method according to the invention, a plurality of processes is performed at different timings, but the invention is not limited thereto. For example, the following structures may be allowed: a structure in which, while a process is being performed, another process is generated; and the time when a process is performed and the time when another process is performed partially or entirely overlap each other.

Advantageous Effects of Invention

According to the invention, an undo process of returning the virtual machine which has been transferred by live migration to a computer, which is a transfer source, in a short time is performed at a high speed. Therefore, even when a computer, which is a transfer destination, is overloaded, it is possible to alleviate the overload in a short time and prevent a reduction in service quality.

BRIEF DESCRIPTION OF THE DRAWINGS

The above and other objects, features, and advantages of the invention will become apparent from the following preferred embodiments and the accompanying drawings.

FIG. 5 is a flowchart illustrating a virtual machine transfer step according to the first embodiment.

FIG. 6 is a flowchart illustrating a virtual machine return step according to the first embodiment.

FIG. 7 is a functional block diagram illustrating a virtual machine handling system according to a second embodiment of the invention.

FIG. 8 is a functional block diagram illustrating a virtual machine handling system according to a third embodiment of the invention.

FIG. 9 is a flowchart illustrating a virtual machine return step according to the third embodiment.

DESCRIPTION OF EMBODIMENTS

Figure 1:
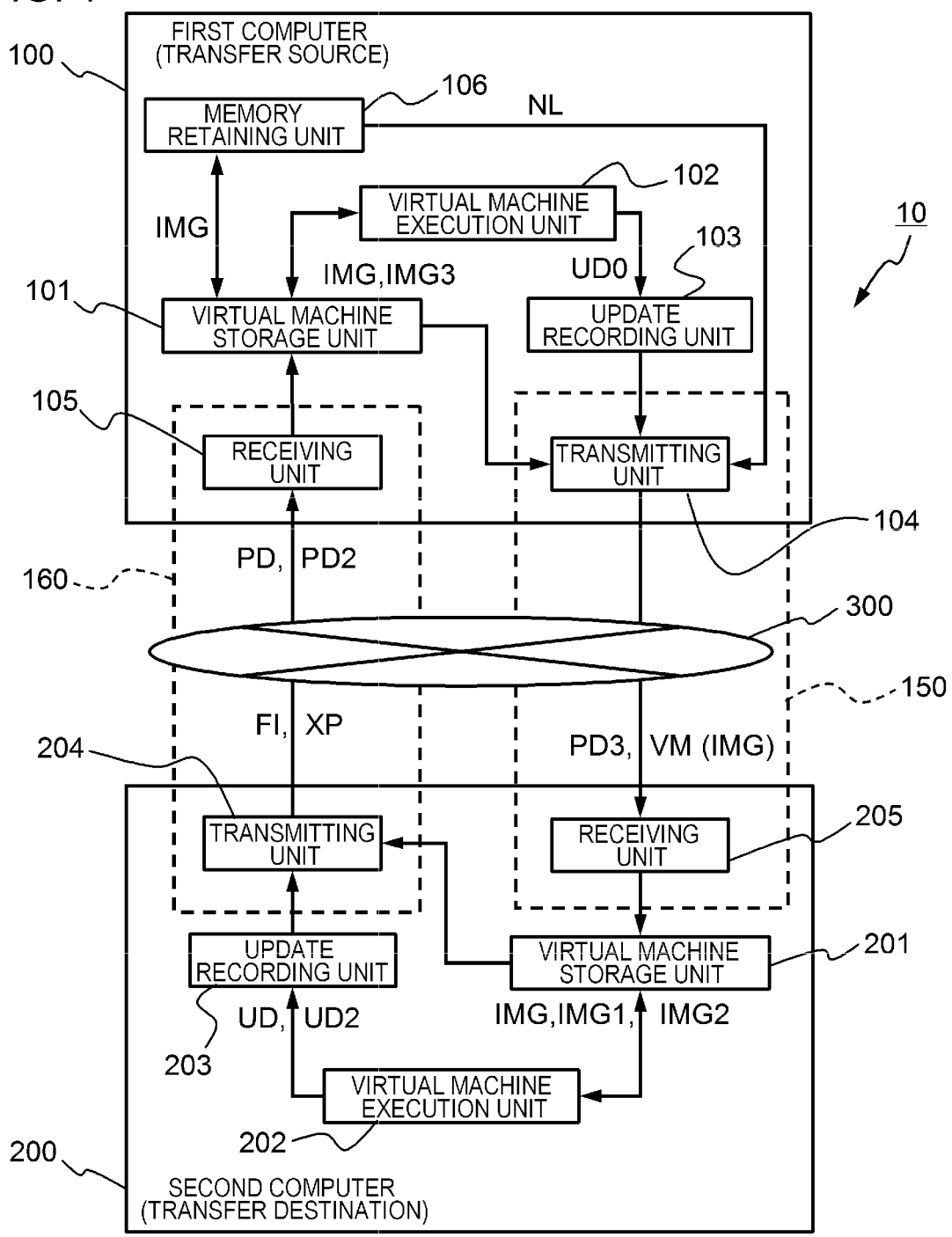
FIG. 1 is a functional block diagram illustrating a virtual machine handling system according to a first embodiment of the invention.

Hereinafter, embodiments of the invention will be described with reference to the accompanying drawings. In all of the drawings, the same components are denoted by the same reference numerals and the description thereof will not be repeated.

First Embodiment

Virtual Machine Handling System

Figure 2:
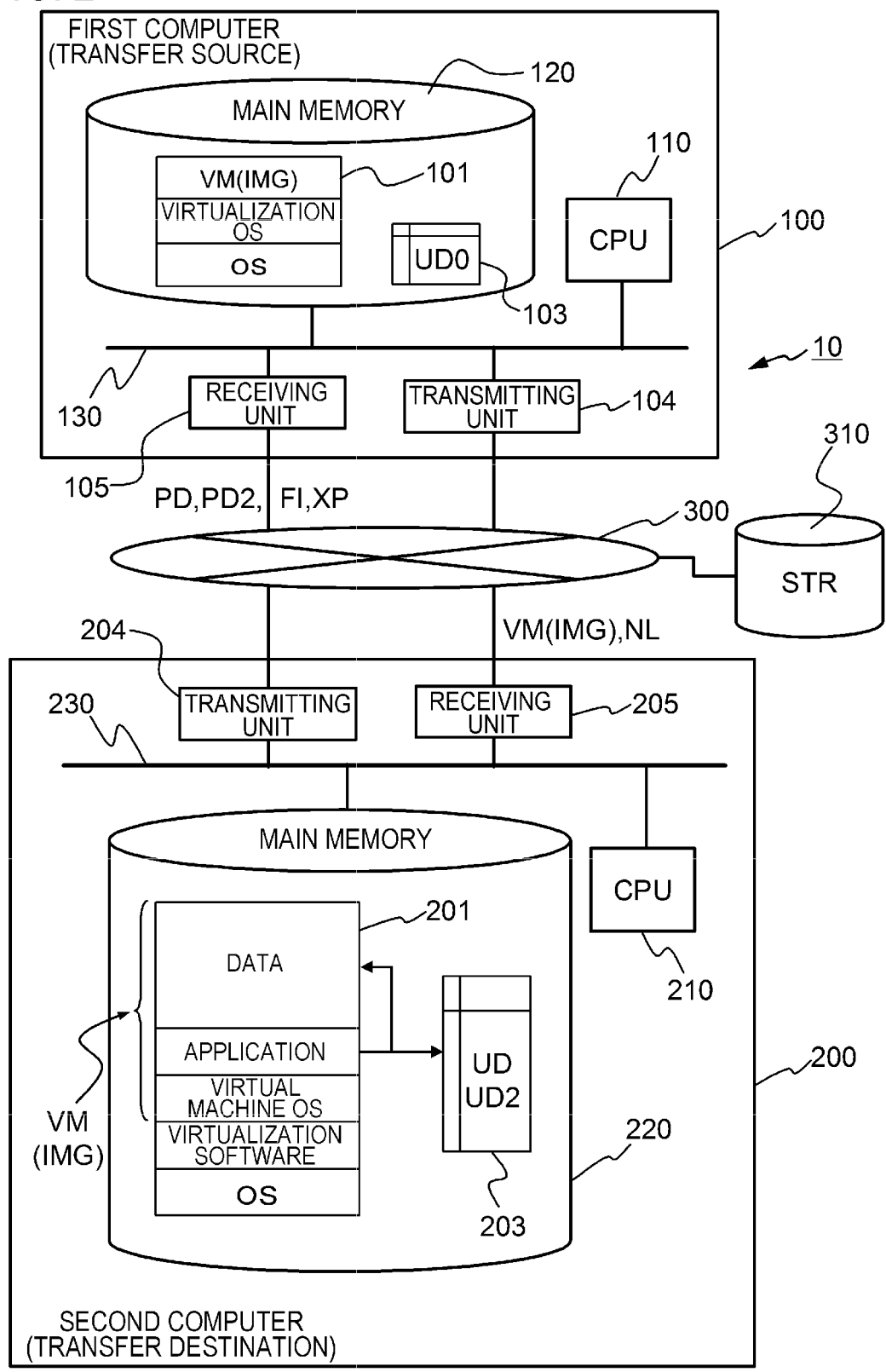
FIG. 2 is a diagram illustrating the structure of the virtual machine handling system according to the first embodiment.

FIG. 1 is a functional block diagram illustrating a virtual machine handling system 10 according to this embodiment. FIG. 2 is a diagram illustrating the structure of the virtual machine handling system 10.

First, the outline of the virtual machine handling system 10 according to this embodiment will be described.

The virtual machine handling system 10 includes a first computer 100, a second computer 200, a transfer unit 150, a memory retaining unit 106, an update recording unit 203, and a return unit 160.

The first computer 100 and the second computer 200 include virtual machine storage units 101 and 201 that store a memory image IMG of a virtual machine VM and virtual machine execution units 102 and 202 that execute the virtual machine VM and update the memory image IMG, respectively. The first computer 100 and the second computer 200 are connected to each other through a network 300.

The transfer unit 150 transmits the memory image IMG of the virtual machine VM executed by the virtual machine execution unit 102 of the first computer 100 to the second computer 200 and transfers the virtual machine VM from the first computer 100 to the second computer 200.

The memory retaining unit 106 retains the memory image IMG stored in the virtual machine storage unit 101 of the first computer 100.

The update recording unit 203 records update information UD indicating a partial region of a memory image IMG1 which is updated by the execution of the transferred virtual machine VM by the virtual machine execution unit 202 of the second computer 200.

When receiving an undo request to return the transferred virtual machine VM from the second computer 200 to the first computer 100, the return unit 160 transmits data (partial data PD) for the partial region indicated by the update information UD from the second computer 200 to the first computer 100, with reference to the update recording unit 203.

In the virtual machine handling system 10 according to this embodiment, the virtual machine execution unit 102 of the first computer 100 executes a continuing process of the virtual machine VM using the memory image IMG retained in the memory retaining unit 106 and the partial data PD received from the second computer 200.

The second computer 200, which is a transfer destination in the virtual machine handling system 10 according to this embodiment, includes a virtual machine storage unit 201, a virtual machine execution unit 202, an update recording unit 203, a transmitting unit 204, and a receiving unit 205.

The receiving unit 205 receives the memory image IMG of the virtual machine VM executed by another computer (first computer 100) which is connected through the network 300 from another computer (first computer 100) and accepts the transferred virtual machine VM.

The virtual machine storage unit 201 stores the received memory image IMG.

The virtual machine execution unit 202 executes the transferred virtual machine VM and updates the stored memory image IMG to a memory image IMG1.

The update recording unit 203 records update information UD indicating a partial region of the stored memory image IMG which is updated to the memory image IMG1 by the virtual machine execution unit 202.

When receiving an undo request to return the transferred virtual machine VM to another computer (first computer 100), the transmitting unit 204 transmits data (partial data PD) for the partial region indicated by the update information UD to another computer (first computer 100), with reference to the update recording unit 203.

The first computer 100, which is a transfer source in the virtual machine handling system 10, includes a virtual machine storage unit 101, a virtual machine execution unit 102, a transmitting unit 104, and a receiving unit 105.

The virtual machine storage unit 101 stores the memory image IMG of the virtual machine VM.

The virtual machine execution unit 102 executes the virtual machine VM and updates the memory image IMG.

The transmitting unit 104 transmits the memory image IMG to another computer (second computer 200) connected through the network 300 and transfers the virtual machine VM.

The receiving unit 105 receives data (partial data PD) for a partial region of the memory image IMG which is updated by another computer (second computer 200).

The virtual machine storage unit 101 stores the memory image IMG of the transferred virtual machine VM and the virtual machine execution unit 102 executes a continuing process of the virtual machine VM using the stored memory image IMG and the received partial data PD.

In this embodiment, the computer may be implemented by, for example, hardware including general-purpose devices, such as a central processing unit (CPU), read only memory (ROM), random access memory (RAM), and an interface unit, a dedicated logic circuit which is configured to perform a predetermined processing operation, or a combination thereof such that the computer can read a computer program and perform a corresponding processing operation.

In this embodiment, various components may be formed so as to implement their functions. For example, the components may be implemented by dedicated hardware with predetermined functions, an information processing device with predetermined functions given by a computer program, predetermined functions of the information processing device implemented by a computer program, or combinations thereof.

In the virtual machine handling system 10 according to this embodiment, storing or recording the memory image or various kinds of information represents that a device forming the virtual machine handling system 10 has at least a function of storing data.

Each of the first computer 100 and the second computer 200 is not limited to a physical computer including one case. For example, for the second computer 200, the virtual machine storage unit 201 which stores the memory image IMG of the transferred virtual machine VM and a storage unit which stores the partial data PD transmitted to the first computer 100 in response to the undo request may be different storage devices which are physically separated from each other.

In the virtual machine handling system 10, the update recording unit and the memory retaining unit may be mounted in the first computer 100 and the second computer 200, respectively, or they may be mounted on another processing device which is connected to the network 300. In this embodiment, a case in which the update recording unit 103 and the memory retaining unit 106 are mounted in the first computer 100 and the update recording unit 203 is mounted in the second computer 200 will be described. The memory retaining unit 206 may be provided in the second computer 200, which will be described in the following second embodiment.

Next, the virtual machine handling system 10 according to this embodiment will be described in detail.

The virtual machine handling system 10 transmits the virtual machine VM from the first computer 100, which is a transfer source of the virtual machine VM, to the second computer 200, which is a transfer destination of the virtual machine VM, through the network 300 using live migration. Then, the virtual machine handling system 10 according to this embodiment returns the transferred virtual machine VM to the first computer 100, which is a transfer source, in a short time.

In the following description, returning the transferred virtual machine VM to a computer, which is a transfer source, is referred to as "undo" and is distinguished from "cancelling" the virtual machine VM before the virtual machine VM is completely transferred.

In the IPC system disclosed in Non-patent Document 1, after the transfer of the virtual machine is completed, a computer, which is a transfer source, releases the page of the virtual machine and discards data. After the virtual machine is completely transferred, a computer, which is a transfer destination, does not record the updated page number of the virtual machine. Therefore, in the IPC system according to the related art, in order to return the virtual machine to the computer, which is a transfer source, after the virtual machine is completely transferred, it is necessary to transmit all data for the virtual machine of the computer, which is a transfer destination, to the computer, which is a transfer source, and an undo process requires a large number of resources and a long time.

In contrast, in the virtual machine handling system 10 according to this embodiment, after the virtual machine VM is completely transferred, the first computer 100, which is a transfer source, does not discard the memory image IMG of the virtual machine VM. After the virtual machine VM is completely transferred, the second computer 200, which is a transfer destination, records the updated page number of the virtual machine VM. When there is an undo request, the partial data PD of the page updated by the second computer 200, which is a transfer destination, is transmitted to the first computer 100, which is a transfer source. In this way, undo is performed in a short time.

The undo request is generated by various factors. A representative example of the factors includes an input operation from the user (operator), a failure occurrence in the second computer 200. That is, in this embodiment, when the virtual machine handling system 10 or a component thereof receives an undo request, an undo process of returning the transferred virtual machine VM to the transfer source (first computer 100) starts based on an external request or an interrupt request.

The network 300 transmits data related to the transfer of the virtual machine VM. The network 300 is, for example, Ethernet (registered trademark). The network 300 may be used to transmit data other than the data related to the transfer of the virtual machine VM.

A shared storage 310 is connected to the network 300. The shared storage 310 stores the main program of the virtual machine VM or data related to various functions or various kinds of content which are provided to the user by the execution of the virtual machine VM.

(First Computer)

As illustrated in FIG. 2, the first computer 100 includes a CPU 110, the transmitting unit 104, the receiving unit 105, and a main memory 120 which are connected to a bus 130.

Next, the function of the first computer 100 will be described.

The virtual machine storage unit 101 stores data including a program of the virtual machine VM as a memory image IMG. The virtual machine storage unit 101 is allocated to the main memory 120 or virtual memory (not illustrated) (see FIG. 2). FIG. 2 illustrates only one virtual machine storage unit 101. However, the main memory 120 may include virtual machine storage units 101 corresponding to the number of virtual machines VM.

The virtual machine execution unit 102 manages the virtual machine VM and executes the program of the virtual machine VM. Specifically, the virtual machine execution unit 102 includes the CPU 110, a shared storage 310, and the main memory 120 (see FIG. 2). The CPU 110 calls data required to execute the virtual machine VM from the shared storage 310, stores the data in the main memory 120, executes the virtual machine VM, and writes the obtained output data to the shared storage 310. This process is performed by virtualization software (SW) which operates on an OS of the first computer 100.

The virtual machine execution unit 102 executes the virtual machine VM to update the memory image IMG stored in the virtual machine storage unit 101. In this embodiment, there are various aspects in which the virtual machine execution unit 102 executes the virtual machine VM to update the memory image IMG. For example, there are the following cases: a case in which the virtual machine execution unit 102 rewrites the memory image IMG stored in the virtual machine storage unit 101; and a case in which the memory image IMG is updated by another unit due to the execution of the virtual machine VM by the virtual machine execution unit 102.

The memory image IMG of the virtual machine VM represents memory data itself which is related to an application or data processed by virtualization software and is stored in the main memory or the virtual memory.

Updating the memory image IMG represents rewriting a portion of or the entire memory image IMG. The update of the memory image IMG includes overwriting the same data to at least a portion of the memory image IMG before update.

Therefore, it is determined whether to update the memory image IMG, regardless of whether the data bits of the memory image IMG are actually changed.

The update recording unit 103 records update information indicating the partial region of the memory image IMG updated by the virtual machine execution unit 102. FIG. 2 illustrates an example of the state in which the update recording unit 103 is provided in the main memory 120, similarly to the virtual machine storage unit 101, but the invention is not limited thereto. The memory image IMG and the update information may be stored in different storage devices.

The unit in which the virtual machine execution unit 102 updates the memory image IMG and the unit in which the update recording unit 103 records the update are not particularly limited, and may be equal to or different from each other.

Data is stored in, for example, memory (main memory 120) and an OS or virtualization software equally divides the region of the memory into a unit of "pages" and manages the pages. In this embodiment, the region of the memory image IMG updated by the virtual machine execution unit 102 is recorded in units of pages. The size of the page is, for example, 4 KB or 4 MB. The memory image IMG is divided into a large number of pages and a page number for identifying each page is set.

The transmitting unit 104 is a communication interface that transmits the memory image IMG to the receiving unit 205 of the second computer 200 when the virtual machine VM is transferred. The receiving unit 105 is a communication interface that receives the partial data PD from the transmitting unit 204 when the undo process is performed on the virtual machine VM.

When live migration from the first computer 100 to the second computer 200 is performed, the transmitting unit 104 sequentially transmits the entire memory image IMG to the receiving unit 205 in units of pages. Therefore, as illustrated in FIG. 1, the transmitting unit 104 of the first computer 100 and the receiving unit 205 of the second computer 200 form the transfer unit 150 in the virtual machine handling system 10.

Data which is transmitted to the receiving unit 205 during live migration includes information required to hand over the process of the virtual machine VM in addition to the memory image IMG of the virtual machine VM. The information includes, for example, a message indicating the state of a register of the CPU, but the description thereof will not be repeated for simplicity.

The virtual machine handling system 10 according to this embodiment is characterized in that the first computer 100 retains the memory image IMG of the virtual machine VM at the time when the virtual machine VM is transferred to the second computer 200 for a predetermined period of time, thereby speeding up the undo process performed in the predetermined period of time.

Specifically, the receiving unit 105 of the first computer 100 receives, from the transmitting unit 204, the partial data PD including the difference between the memory image IMG at the time when it is transferred to the second computer 200 and the memory image IMG1 of the virtual machine VM which is continuously processed and updated by the second computer 200. In this embodiment, in the updated memory image IMG1, data for the page updated by the virtual machine execution unit 202 is transmitted to the first computer 100, thereby undoing the live migration of the virtual machine VM.

That is, the receiving unit 105 of the first computer 100 and the transmitting unit 204 of the second computer 200 form the return unit 160 in the virtual machine handling system 10.

The memory retaining unit 106 illustrated in FIG. 1 controls the storage and removal of the memory image IMG when the virtual machine VM is transferred. Specifically, the memory retaining unit 106 is implemented by the CPU 110 and the main memory 120 (see FIG. 2).

The retainment of the memory image IMG stored in the virtual machine storage unit 101 of the first computer 100 by the memory retaining unit 106 represents that the memory image IMG is retained as to be called. Specifically, the memory retaining unit 106 may transmit the memory image IMG to another storage region and retain the memory image IMG, in addition to retaining the memory image IMG stored in the virtual machine storage unit 101 without removing the memory image IMG from the main memory 120. Alternatively, the memory retaining unit 106 may perform, for example, a compression process to convert the memory image IMG so as to be decompressed and retain the converted memory image IMG.

The memory retaining unit 106 may continuously retain the memory image IMG of the virtual machine VM when the virtual machine VM is completely transferred to the second computer 200, or it may update the retained memory image IMG. That is, at least a portion of the processing result of the virtual machine VM executed by the second computer 200, which is a transfer destination, may be fed back to the first computer 100 during the undo process. In this case, the memory image IMG stored in the first computer 100, which is a transfer source, may be updated after live migration is completed.

When receiving an undo request to return the transferred virtual machine VM to the transfer source, the memory retaining unit 106 directs the virtual machine execution unit 102 to execute a continuing process of the virtual machine VM using the memory image IMG during transfer, as described later.

(Second Computer)

As illustrated in FIG. 2, the second computer 200 includes a CPU 210, the transmitting unit 204, the receiving unit 205, and a main memory 220 which are connected to a bus 230, and includes the same hardware structure as the first computer 100.

Next, the functions of the second computer 200 will be described.

The receiving unit 205 receives the memory image IMG from the virtual machine VM and accepts the transfer of the virtual machine VM.

The virtual machine storage unit 201 stores the received memory image IMG of the virtual machine VM in the main memory 120.

As illustrated in FIG. 2, the virtual machine storage unit 201 is allocated to the main memory 220 or virtual memory (not illustrated). An OS of the second computer 200 and virtualization software (SW) which operates on the OS are stored in the main memory 220. The memory image IMG of the virtual machine VM is hosted on the virtualization software.

The memory image IMG of the virtual machine VM includes a virtual machine OS, applications, and data used by the virtual machine OS or the applications. A plurality of applications may start for one virtual machine OS.

The virtual machine execution unit 202 manages the virtual machine VM and processes the memory image IMG to execute the virtual machine VM. Specifically, the virtual machine execution unit 202 includes the CPU 210, the shared storage 310, and the main memory 220. A portion of or the entire memory image IMG is updated to the memory image IMG1 (see FIG. 1) by executing the transferred virtual machine VM in the virtual machine execution unit 202.

After the transfer of the virtual machine VM is completed, the update recording unit 203 records the update information UD indicating the partial region of the virtual machine storage unit 201 which is updated by the virtual machine execution unit 202. For example, the virtualization software monitors the update of the page of the virtual machine VM and records the updated page number in the main memory 220, thereby implementing the update recording unit 203. The virtual machine storage units 201 corresponding to the number of virtual machines VM executed by the virtual machine execution unit 202 are provided in the main memory 220.

The data format of the update information UD is not particularly limited. In this embodiment, similarly to the update recording unit 103, the update of the memory image IMG1 is recorded in units of pages.

Figure 3:
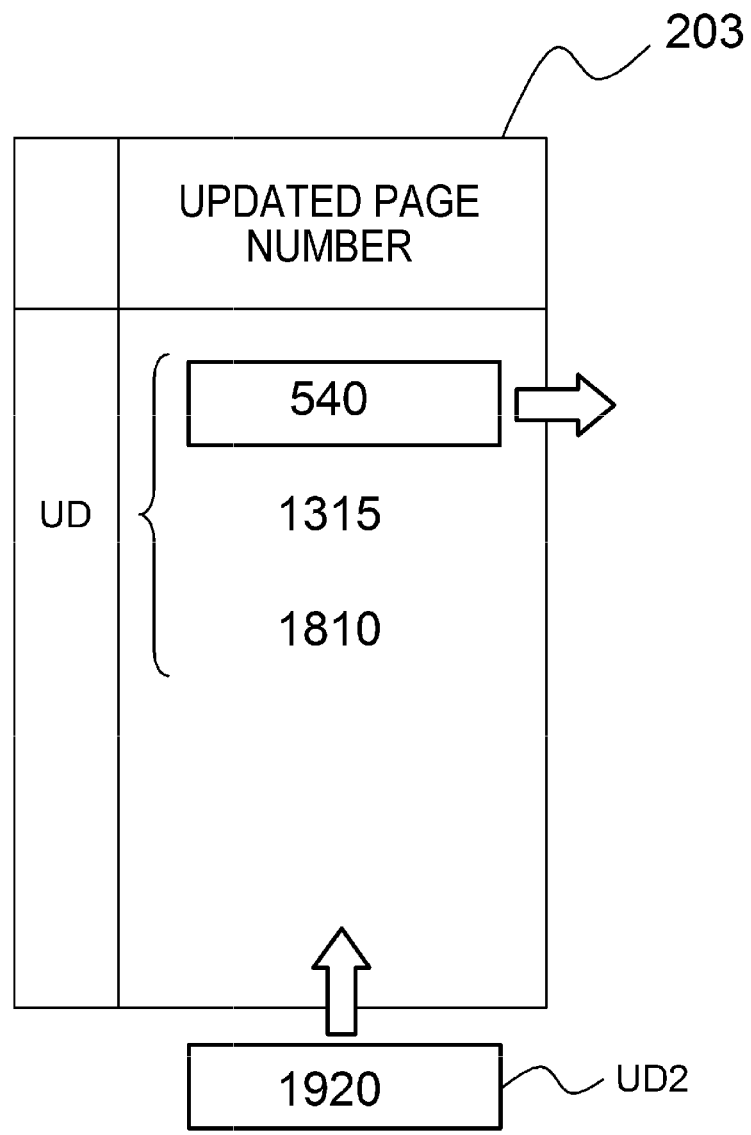
FIG. 3 is a schematic diagram illustrating an example of an update recording unit.

FIG. 3 is a schematic diagram illustrating an example of the update recording unit 203. In the update recording unit 203, a list of the page numbers of the updated pages of the virtual machine VM updated from the memory image IMG to the memory image IMG1 by the virtual machine execution unit 202 is recorded as the update information UD. FIG. 3 illustrates an example in which three page numbers, that is, 540, 1315, and 1810 are recorded in the update recording unit 203. This illustrates that, in the memory image IMG1, the partial regions with the three page numbers are updated from the memory image IMG. For example, as illustrated in FIG. 2, when the application executed by the virtual machine OS updates data for the page indicated by the page number 1315 of the memory image IMG, "1315" is recorded as the update information UD in the update recording unit 203.

However, instead of this embodiment, other data items may be used as the update information UD. Specifically, a memory image (partial image) related to the updated page, not the updated page number, may be stored in the update recording unit 203 so as to be associated with the page number of the partial image.

Returning to FIGS. 1 and 2, the transmitting unit 204 transmits the partial data PD for the page updated by the second computer 200 from the second computer 200 to the first computer 100, with reference to the update recording unit 203, during the undo process.

Referring to the update recording unit 203 represents calling the updated partial region of the memory image based on the update information UD recorded in the update recording unit 203. For example, when the update recording unit 203 is the page numbers arranged in a list form (see FIG. 3), referring to the update recording unit 203 represents acquiring some or all of the recorded page numbers.

FIGS. 1 and 2 illustrate a state in which the partial data PD is called from the virtual machine storage unit 201 of the main memory 220 and is transmitted to the receiving unit 105, but the invention is not limited thereto. For example, the partial data PD of the memory image IMG updated by the virtual machine execution unit 202 may be stored in a storage device (not illustrated) connected to the network 300 so as to be associated with the page number of the partial data PD. During the undo process, the page number and the partial data PD may be transmitted from the storage device to the first computer 100. As such, in the virtual machine handling system 10, the update recording unit 203 may or may not be provided in a hardware component of the second computer 200.

In FIGS. 1 and 2, for simplicity of description, the first computer 100, which is a transfer source, and the second computer 200, which is a transfer destination, are illustrated so as to be distinguished from each other. However, each computer has the functions of both the transfer source and the transfer destination. That is, each computer may serve as both the transfer source (first computer 100) and the transfer destination (second computer 200).

(Virtual Machine Handling Method)

Figure 4:
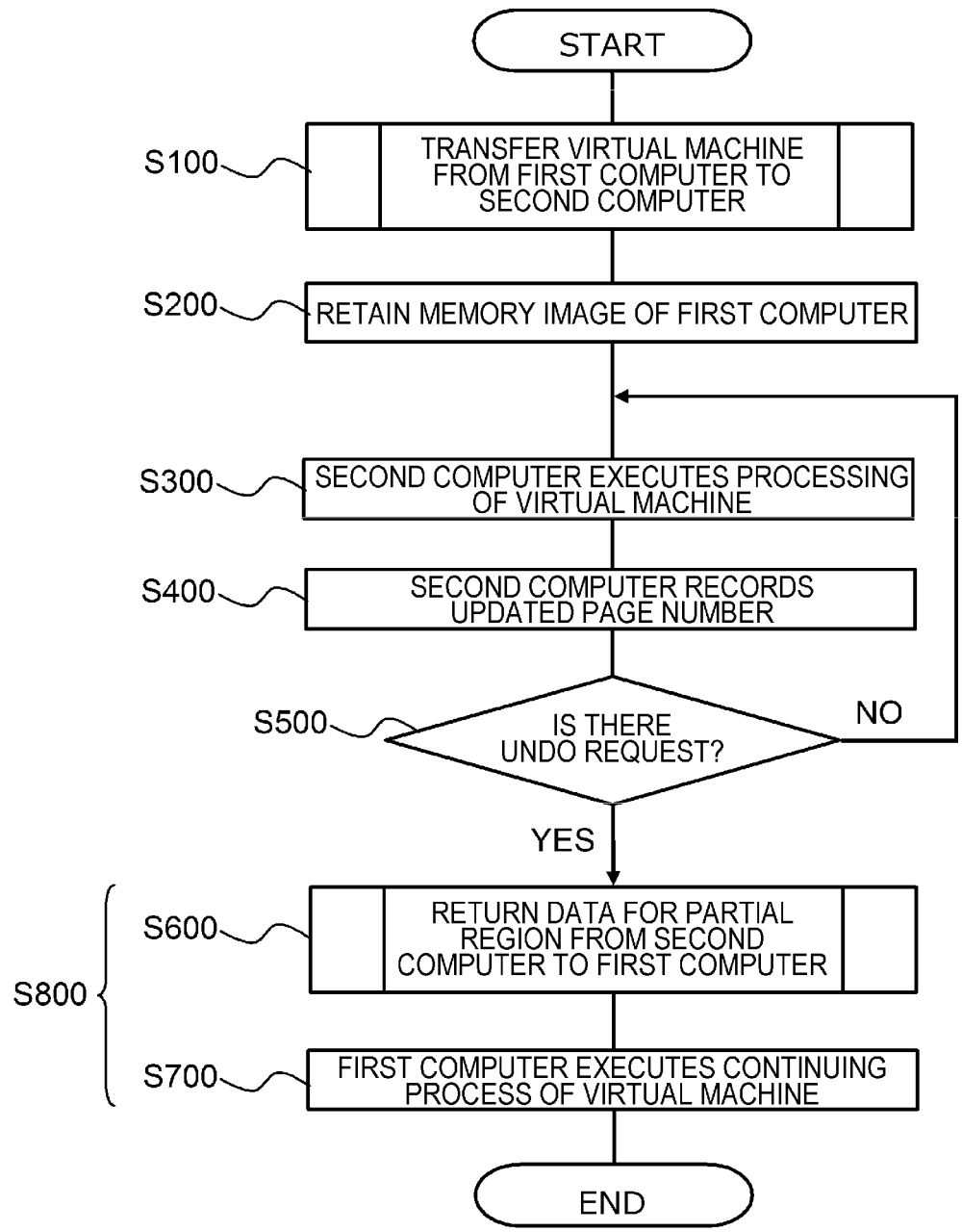
FIG. 4 is a flowchart illustrating a virtual machine handling method according to the first embodiment.

FIG. 4 is a flowchart illustrating this method. Next, the virtual machine handling method (hereinafter, in some cases, referred to as this method) according to this embodiment will be described with reference to FIGS. 1 to 4.

This method includes a transfer step S100, a memory retaining step S200, an update recording step S400, and an undo step S800.

In the transfer step S100, the memory image IMG of the virtual machine VM executed by the first computer 100 is transmitted to the second computer 200 and the virtual machine VM is transferred from the first computer 100 to the second computer 200.

In the memory retaining step S200, the memory image IMG of the first computer 100 is retained.

In the update recording step S400, the second computer 200 executes the transferred virtual machine VM, updates the memory image IMG to the memory image IMG1, and records the update information UD indicating a partial region of the memory image IMG1.

In the undo step S800, the transferred virtual machine VM returns from the second computer 200 to the first computer 100.

The undo step S800 according to this method includes a return step S600 and a continuous execution step S700.

In the return step S600, data (partial data PD) for the partial region indicated by the recorded update information UD is transmitted from the second computer 200 to the first computer 100.

In the continuous execution step S700, the first computer 100 executes a continuing process of the virtual machine VM using the retained memory image IMG of the first computer 100 and the transmitted data (partial data PD) for the partial region.

The return step S600 and the continuous execution step S700 are allowed to be temporally interchanged with each other or overlap each other. That is, the continuous execution step S700 may start after the return step S600 is completed, or the continuous execution step S700 may start before the return step S600 or at the same time as the return step S600 is performed.

This embodiment provides first and second computer programs that allow the first computer 100 and the second computer 200 to perform the virtual machine transfer process and the undo process. In addition, this embodiment provides a storage medium (not illustrated) that stores the first computer program so as to be readable by the first computer 100 and a storage medium (not illustrated) that stores the second computer program so as to be readable by the second computer 200.

The first computer program is a computer program for a computer (first computer 100) that executes the virtual machine VM and allows the computer to perform a virtual machine storing process, a virtual machine execution process, a transmitting process, a retaining process, a receiving process, and a virtual machine continuous execution process.

In the virtual machine storing process, the memory image IMG of the virtual machine VM is stored.

In the virtual machine execution process, the virtual machine VM is executed and the memory image IMG is updated.

In the transmitting process, the memory image IMG is transmitted to another computer (second computer 200) connected through the network 300 and the virtual machine VM is transferred.

In the retaining process, the memory image IMG of the transferred virtual machine VM is retained.

In the receiving process, data (partial data PD) for the partial region of the memory image IMG which is updated by another computer (second computer 200) is received.

In the virtual machine continuous execution process, a continuing process of the virtual machine VM is performed using the retained memory image IMG and the received data (partial data PD) for the partial region.

Allowing the computer to perform various operations corresponding to the computer program represents allowing the computer to control the operations of various devices. For example, allowing the computer to store various kinds of data includes allowing the CPU to store various kinds of data in an information storage medium, such as main memory, fixed to the computer and allowing the CPU to store various kinds of data in an information storage medium which is removably provided in a data processing device.

The second computer program is a computer program for a computer (second computer 200) including the virtual machine execution unit 202 which executes the virtual machine VM and allows the computer to perform a receiving process, a virtual machine storing process, a virtual machine execution process, an update recording process, and a transmitting process.

In the receiving process, the memory image IMG of the virtual machine VM executed by another computer (first computer 100) connected through the network 300 is received from another computer (first computer 100) and the transferred virtual machine VM is accepted.

In the virtual machine storing process, the received memory image IMG is stored.

In the virtual machine execution process, the transferred virtual machine VM is executed and the stored memory image IMG is updated to the memory image IMG1.

In the update recording process, the update information UD indicating the partial region of the stored memory image IMG which is updated by the virtual machine execution unit 202 is recorded.

In the transmitting process, when an undo request to return the transferred virtual machine VM to another computer (first computer 100) is received, data (partial data PD) for the partial region indicated by the update information UD is transmitted to another computer (first computer 100).

Next, this method will be described in detail.

FIG. 5 is a flowchart illustrating the virtual machine transfer step S100. In this method, an example in which the virtual machine VM is transferred from the first computer 100 to the second computer 200 by the IPC system will be described.

First, the transmitting unit 104 of the first computer 100 is connected to the receiving unit 205 of the second computer 200 through the network 300 (Step S102).

Then, the update recording unit 103 of the first computer 100 starts recording the updated page number of the virtual machine VM, which is a transfer target (Step S104).

Then, the transmitting unit 104 of the first computer 100 transmits all data for the memory image IMG of the virtual machine VM to the receiving unit 205 of the second computer 200 (Step S106).

In the IPC system, while the memory image IMG of the virtual machine VM is being transmitted from the first computer 100 to the second computer 200, the first computer 100 continuously executes the virtual machine VM (Step S108). Therefore, at the time when Step S106 ends, the memory image IMG stored in the virtual machine storage unit 101 is updated. The update recording unit 103 records the updated region as update information UD0. The updated region is managed and recorded in units of pages.

When Step S106 ends, the CPU 110 searches for the number of updated pages which are recorded as the update information UD0 by the update recording unit 103 (main memory 120) and determines whether the number of updated pages is equal to or less than a predetermined threshold value (Step S110). The threshold value is set such that data for the updated page recorded in the update information UD0 can be transmitted at a time from the transmitting unit 104 to the receiving unit 205.

When the determination result in Step S110 is "No" (NO in Step S110), the transmitting unit 104 transmits data for the updated page to the receiving unit 205 and deletes the record of the transmitted page number from the update information UD0 (Step S112). Then, the process returns to Step S108. While the transmitting unit 104 is transmitting the data for the updated page, the virtual machine execution unit 102 continuously executes processing of the virtual machine VM (Step S108).

On the other hand, when the number of updated pages is equal to or less than the threshold value (YES in Step S110), the virtual machine execution unit 102 stops processing the virtual machine VM, which is a transfer target (Step S114). The update recording unit 103 ends the recording of the updated page number (Step S116).

After step S114, Step S116 is performed to record all of the updated page numbers updated by the first computer 100 in the update recording unit 103. Therefore, in the following Step S118, data for the updated page is transmitted to the second computer 200 without any exclusion.

Even when Steps S106 to S112 are cancelled, the first computer 100 continuously executes process of the virtual machine VM (Step S108). Therefore, even when a network failure occurs, no failure occurs in the virtual machine.

The transmitting unit 104 of the first computer 100 transmits data for the remaining updated pages recorded in the update information UD0 and the other necessary information to the receiving unit 205 of the second computer 200 (Step S118).

Until the transfer step S100 ends after Step S114, the virtual machine VM is stopped in the virtual machine handling system 10. However, since a small amount of data is transmitted in Step S118, the time required for Step S118 is short, that is, from several milliseconds to several hundreds of milliseconds, and an adverse effect on service quality due to the stopping of the virtual machine VM is small.

The transmitting unit 204 of the second computer 200 transmits, to the receiving unit 105 of the first computer 100, completion information FI indicating that the transfer of the virtual machine VM by the transfer unit 150 (the transmitting unit 104 and the receiving unit 205) is completed (Step S120).

Returning to FIG. 4, in the first computer 100, the memory retaining unit 106 retains the memory image IMG of the virtual machine VM at the time when the transfer of the virtual machine VM is completed (memory retaining step S200). That is, the memory image IMG of the virtual machine VM stored in the virtual machine storage unit 101 is not instantly discarded.

In this case, the memory retaining unit 106 may retain the memory image IMG at the storage position of the main memory 120, or it may evacuate the memory image IMG to another memory which is provided inside or outside the first computer 100. Next, an example in which the memory retaining unit 106 stores the memory image IMG in the virtual machine storage unit 101 (main memory 120) will be described.

The virtual machine storage unit 201 of the second computer 200 stores the memory image IMG received by the receiving unit 205. Then, the processing of the virtual machine VM is resumed using the OS and virtualization software of the second computer 200 and the program and data stored in the shared storage 310.

Then, the virtual machine execution unit 202 of the second computer 200 executes the virtual machine VM and updates the memory image IMG to the memory image IMG1 (Step S300).

The update recording unit 203 records an updated page number indicating a partial region of the memory image IMG1 updated from the memory image IMG as the update information UD (update recording step S400).

Until an undo request to return the transferred virtual machine VM to the first computer 100 is received (NO in Step S500), the second computer 200 continuously executes of processing of the virtual machine VM.

Next, the undo step S800 of returning the transferred virtual machine VM to the first computer 100, which is a transfer source, will be described. In this embodiment, the process of undoing the virtual machine VM is performed by the IPC system.

FIG. 6 is a flowchart illustrating the return step S600 of the undo step S800. It is assumed that the state of the virtual machine storage unit 201 when the undo process starts is the memory image IMG1.

First, the transmitting unit 204 of the second computer 200 is connected to the receiving unit 105 of the first computer 100 (Step S611) and it is checked whether the virtual machine storage unit 101 stores the memory image IMG of the virtual machine VM.

When the virtual machine storage unit 101 does not store the memory image IMG of the virtual machine VM, it is necessary to transmit all data for the memory image IMG1 in the process of undoing the virtual machine VM. However, in this method, since the memory retaining unit 106 stores the memory image IMG of the virtual machine storage unit 101, data to be transmitted in the undo process is only the difference from the memory image IMG.

The conditions that the memory retaining unit 106 discards the memory image IMG in the virtual machine storage unit 101 will be described below.

While the undo process is performed by the IPC system, the virtual machine execution unit 202 of the second computer 200 continuously executes the virtual machine VM (Step S612) and the memory image IMG1 in the virtual machine storage unit 201 is updated.

Then, the CPU 210 searches for the number of updated pages stored in the update recording unit 203 (main memory 220) and determines whether the number of updated pages is equal to or less than a predetermined threshold value (Step S613). The threshold value is set such that data for the updated page recorded in the update information UD can be transmitted at a time from the transmitting unit 204 to the receiving unit 105.

The threshold value may be equal to or different from a threshold value when the update recording unit 103 of the first computer 100 is searched in the transfer step S100 (Step S106).

When the number of updated pages recorded in the update information UD is greater than the threshold value and the determination result in Step S613 is "No" (NO in Step S613), the transmitting unit 204 transmits data (partial data PD) for the partial region indicated by the update information UD to the first computer 100. Specifically, data for the updated page recorded in the update information UD is transmitted to the receiving unit 105. Then, the record of the transmitted page number is deleted from the update information UD (Step S614), and the process returns to Step S612.

While the transmitting unit 204 is transmitting the data for the updated page, the virtual machine execution unit 202 continuously executes processing of the virtual machine VM (Step S612). Therefore, the memory image IMG1 stored in the virtual machine storage unit 201 is updated to a memory image IMG2.

As illustrated in FIG. 3, the update recording unit 203 records the page number of the partial region updated in Step S614 as update information UD2, in addition to the update information UD. It is assumed that data for the partial region recorded in the update information UD2 is partial data PD2.

FIG. 3 illustrates a state in which, in addition to the page numbers 540, 1315, and 1810 recorded as the update information UD, a partial region with page number 1920 in the memory image IMG1 is updated. That is, a page number indicating the partial region updated from the memory image IMG1 to the memory image IMG2 is recorded as the update information UD2 in the update recording unit 203.

FIG. 3 schematically illustrates a state in which the record of the transmitted page number 540 is deleted from the update information UD in Step S614.

That is, in this method, while the return unit 160 (the transmitting unit 204 and the receiving unit 105) is transmitting data (partial data PD) for the partial region to the first computer 100, the second computer 200 continuously executes processing of the virtual machine VM. The second computer 200 continuously executes processing of the virtual machine VM to additionally update the memory image IMG1 to the memory image IMG2. Then, the return unit 160 transmits data (partial data PD2) for the additionally updated partial region in the memory image IMG2 to the first computer 100.

On the other hand, when the number of updated pages is equal to or less than the threshold value (YES in Step S613), the virtual machine execution unit 202 stops the execution of the virtual machine VM to be returned (Step S615). The update recording unit 203 ends the recording of the updated page number (Step S616).

After Step S615, Step S616 is performed to record all of the updated page numbers updated by the second computer 200 in the update recording unit 203. Therefore, in the following Step S617, the partial data PD2 additionally updated by the second computer 200 is transmitted to the first computer 100 without any exclusion.

The transmitting unit 204 of the second computer 200 transmits the partial data items PD and PD2 for the remaining updated pages recorded in the update information items UD and UD2 and the other necessary information to the receiving unit 105 of the first computer 100 (Step S617). Since a small amount of data is transmitted, the time required for the virtual machine VM to be stopped after Step S615 is short. Therefore, the adverse effect of the undo process on service quality is small.

In the undo step S800 of this method using the IPC system, the continuous execution step S700 is performed after Steps S614 and S617 of transmitting the data (partial data items PD and PD2) for the partial regions indicated by the update information items UD and UD2 from the second computer 200 to the first computer 100 are performed once or a plurality of times.

Returning to FIG. 4, in the continuous execution step S700, the first computer 100 executes a continuing process of the virtual machine VM.

In this method, after receiving the data (partial data items PD and PD2) for the partial regions from the second computer 200, the first computer 100 starts the execution of the continuing process (continuous execution step S700).

As described above, in this embodiment, the process of undoing the live migration of the virtual machine VM performed by the IPC system is described. However, the invention is not limited thereto. As in a third embodiment, which will be described below, a post-copy system may be used in which, when there is an undo request, the first computer 100, which is a transfer source, instantly takes over the execution of the virtual machine VM and then receives data for the partial region indicated by the update information.

When predetermined conditions are satisfied after the virtual machine VM is transferred from the first computer 100 to the second computer 200, the memory retaining unit 106 discards the memory image IMG. In addition, the recording of the update information UD (page number) by the update recording unit 203 is not necessarily permanently performed. When the predetermined conditions are satisfied, the recording of the update information UD may end. In this way, it is possible to practically use the process of undoing the live migration of the virtual machine VM, without giving a large load to the main memories 120 and 220.

Specifically, when completion information FI indicating that the transfer of the virtual machine VM by the transfer unit 150 has been completed is received and a discard condition for discarding the stored memory image IMG are satisfied after the completion information FI is received, the memory retaining unit 106 discards the memory image IMG.

The discard condition in this embodiment includes at least one of four cases as follows:

(1) a case in which an empty memory space of the first computer 100 is equal to or less than a predetermined value;

(2) a case in which a predetermined period of time has elapsed from the reception of the completion information FI;

(3) a case in which a recording end notice XP indicating that the recording of the update information UD by the update recording unit 203 has ended is received; and (4) a case in which a request to discard the retained memory image IMG is received.

In the case (1), the retained memory image IMG is discarded to ensure the empty space of the memory (main memory 120), thereby increasing the operation speed of the first computer 100 after the virtual machine VM is transferred. That is, instead of speeding up the process of undoing the virtual machine VM, the operation speed of another virtual machine in the first computer 100 is increased. In this way, it is possible to improve the overall quality of the services provided by the first computer 100.

In the case (2), the memory image IMG is discarded, assuming that the undo process is less likely to be performed after a predetermined period of time has elapsed from the transfer of the virtual machine VM to the second computer 200. In this way, in particular, when the live migration of a plurality of virtual machines is performed, it is possible to appropriately reduce the overload of the first computer 100.

In the case (3), after the recording of the update information UD by the second computer 200 is completed, it is difficult for the second computer 200 to restore the latest memory image of the virtual machine VM using only the memory image IMG stored in the first computer 100 and the partial data PD (and PD2) transmitted from the second computer 200. Therefore, after the recording is completed, the undo request is not received and the memory image IMG from the first computer 100 is discarded.

In the case (4), a command to discard the memory image IMG is received by, for example, an operation input from the user (operator) or a system message from operation management software.

As illustrated in FIGS. 1 and 2, the memory retaining unit 106 transmits a memory discard notice NL indicating that the memory image IMG has been discarded to the second computer 200.

When at least one of the following three recording end conditions is satisfied, the update recording unit 203 ends the recording of the update information UD:

(1) a predetermined period of time has elapsed after the virtual machine execution unit 202 of the second computer 200 starts the execution of the transferred virtual machine VM;

(2) the memory discard notice NL indicating that the memory retaining unit 106 has discarded the stored memory image IMG is received; and (3) a request to end the recording of the update information UD is received.

In the case (1), the undo request is not received since it is assumed that the undo process is less likely to be performed after a predetermined period of time has elapsed and the amount of data for the partial data PD indicated by the update information UD is large. Specifically, the CPU 210 of the second computer 200 may measure the time elapsed from the start of Step S300 (see FIG. 4) and the recording of the update information UD by the update recording unit 203 may end when the measured time is more than a predetermined threshold time.

In the case (2), when the memory discard notice NL is received from the first computer 100, the recording of the update information UD by the update recording unit 203 ends.

In the case (3), a command to end the recording of the update information UD is received by, for example, an operation input from the user (operator) or a system message from the operation management software.

The update recording unit 203 transmits the recording end notice XP indicating that the recording of the update information UD has ended to the first computer 100.

As described above, according to this method, the first computer 100, which is a transfer source, does not discard the memory image IMG of the virtual machine VM immediately after the transfer of the virtual machine VM is completed, and the second computer 200, which is a transfer destination, records the updated page number of the virtual machine VM after the transfer of the virtual machine VM is completed. When there is an undo request, the second computer 200, which is a transfer destination, returns only the partial data items PD and PD2 of the updated pages to the first computer 100, which is a transfer source. In this way, it is possible to return the transferred virtual machine VM to a computer, which is a transfer source, in a short time.

In addition, the retainment of the memory image IMG by the memory retaining unit 106 of the first computer 100 and the recording of the update information UD by the update recording unit 203 of the second computer 200 end when the predetermined conditions are satisfied. In this way, it is possible to practically perform the process of undoing live migration, without overloading the system resources of the main memories 120 and 220.

Second Embodiment

FIG. 7 is a functional block diagram illustrating a virtual machine handling system 10 according to this embodiment.

The virtual machine handling system 10 according to this embodiment transfers a virtual machine VM which is returned to a first computer 100 by an undo process to a second computer 200 again using live migration (hereinafter, referred to as a redo process).

The virtual machine handling system 10 according to this embodiment differs from the virtual machine handling system 10 according to the first embodiment in that it includes a memory retaining unit 206 which retains another memory image IMG2 stored in a virtual machine storage unit 201 of the second computer 200.

An update recording unit 103 according to this embodiment records update information UD3 indicating a partial region of a memory image IMG3 which is updated by a virtual machine execution unit 102 of the first computer 100.

When a redo request to return a virtual machine VM from the first computer 100 to the second computer 200 is received after executing a continuing process of the virtual machine VM (continuous execution Step S700: see FIG. 4), the virtual machine handling system 10 performs the following process.

First, a transfer unit 150 (a transmitting unit 104 and a receiving unit 205) transmits data (partial data PD3) for the partial region indicated by the update information UD3 from the first computer 100 to the second computer 200 with reference to the update recording unit 103.

Then, a virtual machine execution unit 202 of the second computer 200 executes the virtual machine VM again using the memory image IMG2 retained in the memory retaining unit 206 and the data (partial data PD3) for the partial region received from the first computer 100.

That is, in the second computer 200, the memory retaining unit 206 stores the latest memory image IMG2 of the virtual machine VM in the virtual machine storage unit 201 in Step S615 (see FIG. 6) of a return step S600. When the virtual machine handling system 10 receives a redo request, the second computer 200 resumes a continuing process of the virtual machine VM using the memory image IMG2 stored in the virtual machine storage unit 201 and the partial data PD3 indicated by the update information UD3 which is stored in the update recording unit 103 of the first computer 100.

Similarly to the above-mentioned discard condition related to the memory retaining unit 106, the discard condition that the memory retaining unit 206 discards the memory image IMG2 is satisfied in at least one of the following four cases:

(1) a case in which an empty memory space of the second computer 200 is equal to or less than a predetermined value;

(2) a case in which a predetermined period of time has elapsed from the completion of the undo process;

(3) a case in which a recording end notice XP indicating that the recording of the update information UD3 by the update recording unit 103 has ended is received from the first computer 100; and (4) a case in which a request to discard the stored memory image IMG2 is received.

The memory retaining unit 206 which has discarded the memory image IMG2 may transmit a memory discard notice NL to the first computer 100 through a transmitting unit 204. When receiving the memory discard notice NL, the first computer 100 may end the recording of the update information UD3 by the update recording unit 103.

In this embodiment, the second computer 200, which is a transfer destination (undo source), stores the memory image IMG2 of the virtual machine VM after the undo process is completed and the first computer 100, which is a transfer source (undo destination), records the updated page number (update information UD3) of the virtual machine VM after the undo process is completed. In this way, when the undo process is undone (redo process), the partial data PD3, which is data for the page updated by the first computer 100, may be transmitted to the second computer 200, which is a transfer destination (undo source).

Third Embodiment

A virtual machine handling system 10 according to this embodiment performs a process of undoing the live migration of a virtual machine VM using a post-copy system.

FIG. 8 is a functional block diagram illustrating the virtual machine handling system 10 according to this embodiment.

In the virtual machine handling system 10 according to this embodiment, when receiving an undo request, a first computer 100 executes the virtual machine VM using a memory image IMG retained in a memory retaining unit 106 and updates a portion of the memory image IMG (see FIG. 8). Then, the first computer 100 updates the memory image IMG to a memory image IMG4 and executes a continuing process of the virtual machine VM using the updated memory image IMG4 and data (partial data PD) for the partial region received from a second computer 200.

Specifically, when receiving an undo request, a return unit 160 (a receiving unit 105 and a transmitting unit 204) transmits update information UD recorded in an update recording unit 203 to the first computer 100. The first computer 100 updates regions other than the region indicated by the update information UD in the memory image IMG which is retained in the memory retaining unit 106 to a memory image IMG4, receives data (partial data PD) for the partial region, and executes a continuing process of the virtual machine VM.

That the return unit 160 transmits the update information UD to the first computer 100 in response to the undo request means that the return unit 160 transmits data indicated by the partial region corresponding to the update information UD which is recorded by the update recording unit 203 in an update recording step S400 to the receiving unit 105. That is, the update information UD transmitted from the transmitting unit 204 to the receiving unit 105 does not need to be the same as the update information UD recorded by the update recording unit 203.

That is, the transmitting unit 204 according to this embodiment transmits the update information UD to the receiving unit 105, prior to the partial data PD of the memory image IMG1 during the undo process. Specifically, the transmitting unit 204 transmits an updated page number list as the update information UD.

When receiving the information, the receiving unit 105 transmits the updated page number list to a virtual machine execution unit 102. The virtual machine execution unit 102 resumes processing the virtual machine VM using the updated page number list and the memory image IMG stored in a virtual machine storage unit 101.

The first computer 100 starts updating the page which has not been updated in the memory image IMG with reference to the updated page number list.

An update recording unit 103 records update information UD3 indicating that the memory image IMG is updated to a memory image IMG4.

A transmitting unit 104 transmits a request message RQ to transmit data (partial data PD) for the partial region indicated by the update information UD to a receiving unit 205.

The request message RQ is a message that requests the receiving unit 105 to preferentially transmit the partial data PD.

When receiving the partial data PD from the transmitting unit 204, the first computer 100 waits for the reception of an update completion notice from the receiving unit 105 and then processes the data. For data for the updated pages which have not been received, when the virtual machine execution unit 102 rewrites all of the pages, or when data for the pages is not needed, the page number recorded in the updated page number list may be deleted and may not be received. The virtual machine execution unit 102 receives the partial data PD until data for all updated pages is received, while processing the virtual machine VM.

As illustrated in FIG. 8, the memory retaining unit 206 of the second computer 200 may store the memory image IMG1 in a virtual machine storage unit 201 during the undo process in the virtual machine storage unit 201. In this way, during a process of redoing the live migration of the virtual machine VM, a virtual machine execution unit 202 can rapidly perform a handover process.

In this method, after the first computer 100 receives the update information UD (updated page number list) from the second computer 200, the virtual machine execution unit 102 starts processing the partial region which is not included in the update information UD. In this way, the partial region which is common to the first computer 100 and the second computer 200 is not updated.

FIG. 9 is a flowchart illustrating the return step S600 for the virtual machine VM in this method. FIG. 4 is a flowchart illustrating the entire virtual machine handling method according to this embodiment, which is common to the first embodiment. Therefore, the description of a process from the transfer step S100 to Step S500 will not be repeated.

First, the transmitting unit 204 of the second computer 200 is connected to the receiving unit 205 of the first computer 100 (Step S621) and checks whether the virtual machine storage unit 101 stores the memory image IMG for undoing the virtual machine VM.

Then, the virtual machine execution unit 202 stops processing the virtual machine VM (Step S622). Then, the transmitting unit 204 of the second computer 200 transmits all updated page numbers in the update information UD which is stored in the update recording unit 203 as the updated page number list to the receiving unit 105 (Step S623).

The virtual machine execution unit 102 of the first computer 100 receives the updated page number list and resumes processing the virtual machine VM (Step S624). The virtual machine execution unit 102 determines whether the partial data PD for the updated page which has not been received is needed right away (Step S626) while continuously executing the virtual machine VM (Step S625).

When it is determined that the partial data PD is needed right away (YES in Step S626), the receiving unit 105 is requested to receive necessary partial data PD. When the partial data PD is received and necessary data is obtained, the corresponding updated page number is deleted from the updated page number list (Step S627) and the process returns to Step S625.

When it is determined that there is no partial data PD which has not been received and is needed right away (NO in Step S626), the virtual machine execution unit 102 determines whether there is remaining partial data PD which has not been received, while processing the virtual machine VM (Step S628). When it is determined that there is data which has not been received (YES in Step S628), some of the partial data items PD which have not been received are received, and the corresponding updated page numbers are deleted from the updated page number list (Step S629). Then, the process returns to Step S625. When all data is received (NO in Step S628), the undo process ends.

Then, in the continuous execution step S700 (see FIG. 4), the virtual machine VM is processed using the memory image IMG4 which is updated from the memory image IMG by the first computer 100 and the partial data PD received from the second computer 200.

As described above, in the undo step S800 of this method, the first computer 100 executes the virtual machine VM using the stored memory image IMG of the first computer 100 (Step S624), updates the memory image IMG to the memory image IMG4, and performs the return step (Step S627). In the return step, data (partial data PD) for the partial region is transmitted from the second computer 200 to the first computer 100.

In other words, the undo step S800 of this method further includes an update information transmitting step (Step S623) of transmitting the update information UD to the first computer 100 and a preprocessing step (Step S625) of allowing the first computer 100 to execute the virtual machine VM using the stored memory image IMG of the first computer 100 and to update a region other than the region indicated by the update information UD in the memory image IMG. In this method, the continuous execution step S700 is performed using the data (partial data PD) for the partial region transmitted in Step S627 and the memory image IMG4 updated in the preprocessing step (Step S624).

In this method, the undo process is performed by the postcopy system. Therefore, during the undo process, the updated page number list is transmitted from the second computer 200, which is a transfer destination, to the first computer 100, which is a transfer source, and the first computer 100 immediately takes over the processing of the virtual machine VM. In this way, it is possible to reduce the load of the second computer 200, which is a transfer destination, faster than when the IPC-type undo process is performed as in the first embodiment.

In each of the above-described embodiments, the memory image IMG retained in the memory retaining unit 106 is not updated until the undo process is performed. However, the invention is not limited thereto.

That is, whenever the virtual machine execution unit 202 updates a predetermined amount of data for the memory image stored in the virtual machine storage unit 201, the transmitting unit 204 may transmit the partial data PD to the receiving unit 105 and the memory image IMG retained in the memory retaining unit 106 may be updated. Then, the second computer 200 deletes the update information UD corresponding to the transmitted partial data PD from the update recording unit 203.

This process may be performed when the processing load of the virtual machine handling system 10 is low, in parallel to the processing of the virtual machine VM by the second computer 200 (Step S300: see FIG. 4).

In this way, it is possible to reduce the amount of partial data PD to be transmitted from the second computer 200 to the first computer 100 during the undo process and thus achieve a rapid undo process.

In the above-described embodiments, each unit of the virtual machine handling system 10 is logically implemented as various functions by the computer program. However, each unit may be formed as a unique hardware, or it may be implemented by a combination of software and hardware.

This application claims the benefit of priority to Japanese Patent Application No. 2010-019558, filed on Jan. 29, 2010, the entire content of which is incorporated herein by reference.

The invention claimed is:

1. A virtual machine handling system comprising:
a first computer and a second computer which are connected to each other through a network and each of which includes a virtual machine storage unit that stores a memory image of a virtual machine and a virtual machine execution unit that executes the virtual machine and updates the memory image;
a transfer unit that transmits the memory image of the virtual machine executed by the virtual machine execution unit of the first computer to the second computer and transfers the virtual machine from the first computer to the second computer;
a memory retaining unit of the first computer that retains the memory image stored in the virtual machine storage unit of the first computer;
an update recording unit that records update information indicating a partial region of the memory image which is updated by the execution of the transferred virtual machine by the virtual machine execution unit of the second computer; and
a return unit that transmits data for the partial region indicated by the update information from the second computer to the first computer with reference to the update recording unit when an undo request to return the transferred virtual machine from the second computer to the first computer is received,
wherein the virtual machine execution unit of the first computer executes a continuing process of the virtual machine using the memory image retained in the memory retaining unit and the data for the partial region received from the second computer,
wherein the memory retaining unit discards the memory image when completion information indicating that the transfer of the virtual machine by the transfer unit has been completed is received and a discard condition for discarding the retained memory image is satisfied after the completion information is received,
wherein the memory retaining unit does not discard the retained memory image until the discard condition is satisfied, and
wherein the discard condition is satisfied when the first computer receives a request for discarding the retained memory image from the second computer.

2. The virtual machine handling system according to claim 1,
wherein the discard condition further includes at least one of the following cases:
a case in which an empty memory space of the first computer is equal to or less than a predetermined value;
a case in which a predetermined period of time has elapsed from the reception of the completion information; and
a case in which a recording end notice indicating that the recording of the update information by the update recording unit has ended is received.

3. The virtual machine handling system according to claim 2,
wherein the memory retaining unit transmits a memory discard notice indicating that the memory image has been discarded to the second computer.

4. The virtual machine handling system according to claim 1,
wherein the update recording unit ends the recording of the update information when at least one of the following recording end conditions is satisfied:
a predetermined time has elapsed from the start of the execution of the transferred virtual machine by the virtual machine execution unit of the second computer;
a memory discard notice indicating that the memory image has been discarded is received; and
a request to end the recording of the update information is received.

5. The virtual machine handling system according to claim 4,
wherein the update recording unit transmits a recording end notice indicating that the recording of the update information has ended to the first computer.

6. The virtual machine handling system according to claim 1,
wherein the first computer starts the execution of the continuing process after receiving the data for the partial region from the second computer.

7. The virtual machine handling system according to claim 6,
wherein, while the return unit is transmitting the data for the partial region to the first computer, the second computer continuously executes the virtual machine and additionally updates the memory image, and
the return unit transmits data for the additionally updated partial region of the memory image to the first computer.

8. The virtual machine handling system according to claim 1,
wherein, when receiving the undo request, the first computer executes the virtual machine using the memory image retained in the memory retaining unit and updates a portion of the memory image, thereafter executes a continuing process of the virtual machine using the updated memory image and the data for the partial region received from the second computer.

9. The virtual machine handling system according to claim 8,
wherein, when receiving the undo request, the return unit transmits the update information recorded in the update recording unit to the first computer, and
the first computer updates a region other than the region indicated by the update information in the memory image which is retained in the memory retaining unit, thereafter receives data for the partial region, and executes a continuing process of the virtual machine.

10. The virtual machine handling system according to claim 1,
wherein the memory retaining unit further retains another memory image stored in the virtual machine storage unit of the second computer, and
the update recording unit further records another update information indicating the partial region of the memory image which is updated by the virtual machine execution unit of the first computer.

11. The virtual machine handling system according to claim 10,
wherein, when a redo request to return the virtual machine from the first computer to the second computer is received after the continuing process of the virtual machine is executed, the transfer unit transmits data for the partial region indicated by said another update information from the first computer to the second computer with reference to the update recording unit, and
the virtual machine execution unit of the second computer executes the virtual machine again using said another memory image retained in the memory retaining unit and the data for the partial region received from the first computer.

12. A virtual machine handling method comprising:

transmitting a memory image of a virtual machine executed by a first computer to a second computer and transferring the virtual machine from the first computer to the second computer;

retaining, in the first computer, the memory image of the first computer;

recording update information indicating a partial region of the memory image updated by the execution of the transferred virtual machine by the second computer; and returning the transferred virtual machine from the second computer to the first computer, wherein said returning the transferred virtual machine includes:

transmitting data for the partial region indicated by the recorded update information from the second computer to the first computer;

allowing the first computer to execute a continuing process of the virtual machine using the retained memory image of the first computer and the transmitted data for the partial region; and discarding the memory image when completion information indicating that the transferring of the virtual machine has been completed is received and a discard condition for discarding the retained memory image is satisfied after the completion information is received, wherein the retained memory image is not discarded until the discard condition is satisfied, and wherein the discard condition is satisfied when the first computer receives a request for discarding the retained memory image from the second computer.

13. The virtual machine handling method according to claim 12, wherein said allowing the first computer to execute the continuing process of the virtual machine is performed after said transmitting the data for the partial region is performed once or a plurality of times.

14. The virtual machine handling method according to claim 12, wherein said transmitting the data for the partial region is performed after the first computer executes the virtual machine using the retained memory image of the first computer.

15. The virtual machine handling method according to claim 14, said returning the transferred virtual machine further including:

transmitting the update information to the first computer; and allowing the first computer to execute the virtual machine using the retained memory image of the first computer and update a region other than the region indicated by the update information in the memory image, wherein said allowing the first computer to execute the continuing process of the virtual machine is performed using data for the partial region transmitted from the second computer to the first computer and the updated memory image.

16. A computer comprising:

a virtual machine storage unit that stores a memory image of a virtual machine;

a virtual machine execution unit that executes the virtual machine and updates the memory image;

a transmitting unit that transmits the memory image to another computer which is connected through a network and transfers the virtual machine;

a memory retaining unit of the computer that retains the memory image that is stored in the virtual storage unit; and a receiving unit that receives data for a partial region of the memory image which is updated by the another computer, wherein the virtual machine storage unit stores the memory image of the transferred virtual machine, wherein the virtual machine execution unit executes a continuing process of the virtual machine using the stored memory image and the received data for the partial region, wherein the memory retaining unit discards the memory image when completion information indicating that the transfer of the virtual machine by the transmitting unit has been completed is received and a discard condition for discarding the retained memory image is satisfied after the completion information is received, wherein the memory retaining unit does not discard the retained memory image until the discard condition is satisfied, and wherein the discard condition is satisfied when the computer receives a request for discarding the retained memory image from the another computer.

17. A non-transitory storage medium that stores a computer program so as to be readable by the computer, the computer program allowing a computer executing a virtual machine to perform data processing, the data processing including:

a virtual machine storage process of storing a memory image of the virtual machine;

a virtual machine execution process of executing the virtual machine and updating the memory image;

a transmitting process of transmitting the memory image to another computer which is connected through a network and transferring the virtual machine;

a memory retaining process of the data processing of the computer of retaining the memory image that is stored in the virtual storage unit;

a retaining process of retaining the memory image of the transferred virtual machine;

a receiving process of receiving data for a partial region of the memory image which is updated by another computer;

a virtual machine continuous execution process of executing a continuing process of the virtual machine using the retained memory image and the received data for partial region a discarding process of discarding the memory image when completion information indicating that the transferring of the virtual machine by the transmitting process has been completed is received and a discard condition for discarding the retained memory image is satisfied after the completion information is received, wherein the discarding process does not discard the retained memory image until the discard condition is satisfied, and wherein the discard condition is satisfied when the a request for discarding the retained memory image is received from the another computer.

\* \* \* \* \*

UNITED STATES PATENT AND TRADEMARK OFFICE
CERTIFICATE OF CORRECTION

| | | |
|---|---|---|
| PATENT NO. | : 9,047,110 B2 | Page 1 of 1 |
| APPLICATION NO. | : 13/575889 | |
| DATED | : June 2, 2015 | |
| INVENTOR(S) | : Shingo Takeda | |

It is certified that error appears in the above-identified patent and that said Letters Patent is hereby corrected as shown below:

In The Specification

Column 1, Line 9: Delete "2010," and insert -- 2011, --

In The Claims

Column 26, Line 61: In Claim 17, delete "the a" and insert -- the --

Signed and Sealed this
Nineteenth Day of January, 2016

Michelle K. Lee
*Director of the United States Patent and Trademark Office*